Dec. 17, 1957  G. G. GRISSINGER ET AL  2,817,059
PROTECTIVE APPARATUS
Filed Feb. 21, 1956  3 Sheets-Sheet 1

WITNESSES
Edwin E. Bassler
Leon M. Gorman

INVENTORS
George G. Grissinger
& Ernest W. Stohr
BY
ATTORNEY

United States Patent Office 2,817,059
Patented Dec. 17, 1957

2,817,059
PROTECTIVE APPARATUS

George G. Grissinger, Wilkinsburg, and Ernest W. Stohr, Penn Township, Allegheny County, Pa., assignors to Westinghouse Electric Corporation, East Pittsburgh, Pa., a corporation of Pennsylvania Application February 21, 1956, Serial No. 566,868

9 Claims. (Cl. 324—28)

Our invention relates, generally, to protective apparatus and, more particularly, to apparatus for testing the operation of protective devices, such as network protectors.

In a power distribution system, different distribution voltages are frequently utilized. Thus, in certain parts of a system 277/480 volt network protectors may be utilized and in other parts of the same system 125/216 volt network protectors may be utilized. However, the same network relays, operating motors and tripping devices may be utilized on the protectors for both voltages by providing autotransformers to obtain the correct operating voltages for the protectors on the higher voltage networks.

It is desirable, from an operating company standpoint, to be able to test the 277/480 volt protectors with the same test equipment as that utilized for testing the 125/216 volt protectors. In order to do this, it is necessary to provide a means for disconnecting the control and relaying autotransformers from a protector during the tests.

An object of our invention is to provide for operating a network protector at a certain voltage and testing it at a lower voltage.

Another object of our invention is to provide for connecting a network protector for operation at a relatively high distribution voltage when the protector is in the operating position in a supporting structure and automatically changing the connections for testing at a lower voltage when the protector is moved from the operating position to the test position in the supporting structure.

Other objects of our invention will be explained fully hereinafter or will be apparent to those skilled in the art.

In accordance with one embodiment of our invention the relays of a network protector are connected to autotransformers through a group of auxiliary switches which are mechanically closed when the protector is in the operating position in an enclosure or supporting structure. When the protector is withdrawn to the test position the relays are disconnected from the autotransformers and transferred to connections suitable for testing by automatically opening the first group of auxiliary switches and closing another group. Thus, the same testing equipment and the same relays may be utilized on protectors which are used on distribution systems of different voltages.

For a better understanding of the nature and objects of the invention, reference may be had to the following detailed description, taken in conjunction with the accompanying drawings, in which.

Figure 1:
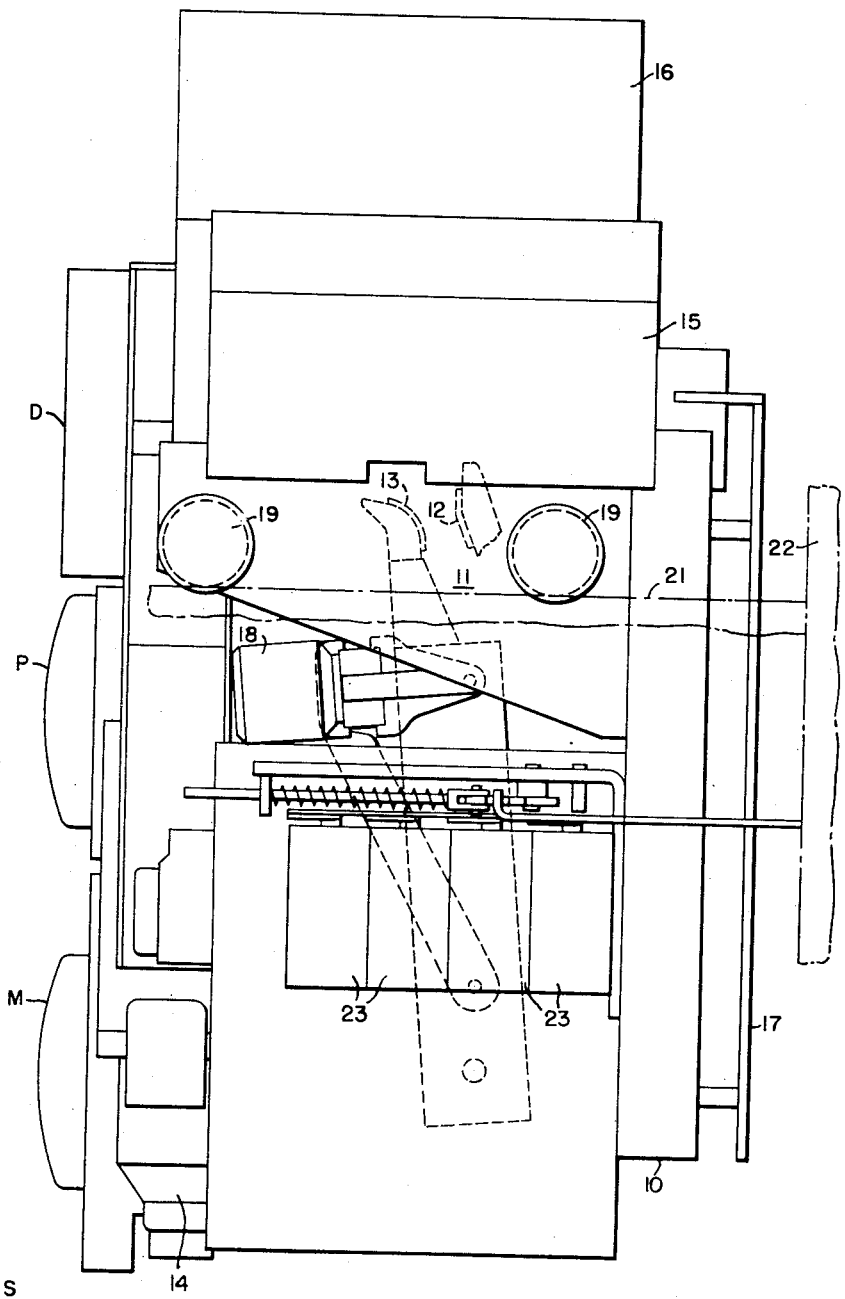
Figure 1 is a view, in side elevation, of a network protector embodying the principal features of the invention.

Referring to the drawings, and particularly to Fig. 1, the network protector shown therein is generally of the type described in Patent No. 2,157,714, issued May 9, 1939, to J. B. MacNiell. Briefly, the protector comprises a panel 10 on which a circuit interrupter 11 is mounted. The circuit interrupter 11 has a fixed contact 12 and a movable contact 13. The movable contact 13 is closed by a motor 14 which drives an operating mechanism (not shown). The operating mechanism may be of the type disclosed in Patent No. 2,264,982, issued December 2. 1941, to F. D. Johnson.

As described in the aforesaid patent, 2,264,982, the operation of the circuit interrupter 11 is controlled by a master relay M and a phasing relay P. A desensitizing relay D may also be supplied if desired. Since the relay D is optional equipment it is not shown in the diagram in Fig. 4 of this application. The circuit interrupter 11 is of a three-pole type for use on a three-phase system. An arc chute 15 is provided for each pole of the circuit interrupter. Protective barriers 16 and 17 are provided for protecting energized parts of the structure. A resilient shock absorber 18 is connected to the moving contact 13 to absorb the kinetic energy of the moving contact.

As described in Patent No. 2,295,405, issued September 8, 1942, to F. D. Johnson and A. L. Cumming, the protector unit may be provided with wheels 19 which are mounted on a track 21 attached to a supporting structure 22. Thus, the terminals of the protector may be disconnected from the in-coming and out-going power conductors and the protector unit may be rolled from its normal operating position to a test position in the enclosing cell or supporting structure.

As explained hereinbefore, a network protector having relays designed for use on a low voltage distribution system, such as 125/216 volts, may be utilized on a higher voltage system, such as 277/480 volts, by providing auto transformers to reduce the voltage applied to the relays when operating on the higher voltage system. As also explained hereinbefore, it is necessary to disconnect the relays from the autotransformers and connect them to the poles of the protector during testing of the protector in order to utilize test equipment designed for use at the lower voltage. The protector may be tested by utilizing equipment of the type described in Patent 2,376,775, issued May 22, 1945, to F. D. Johnson.

Figure 2:
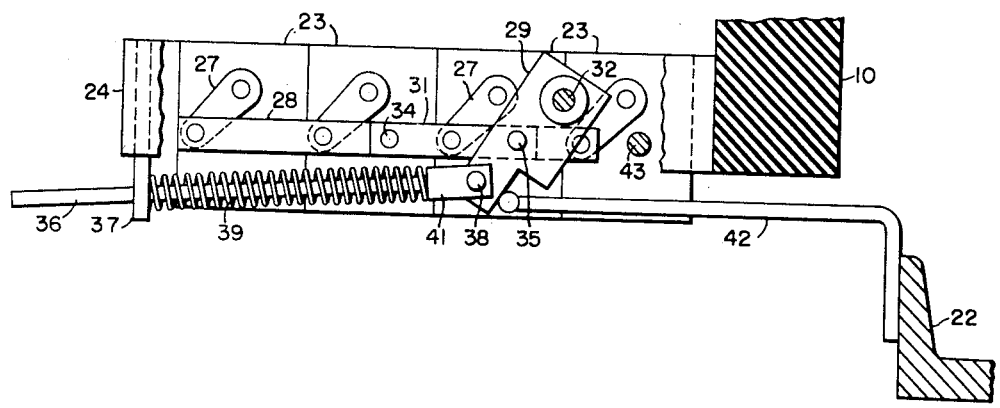
Fig. 2 is an enlarged detail view, in plan, of a mechanism for actuating changeover switches provided for the network protector.
Figure 3:
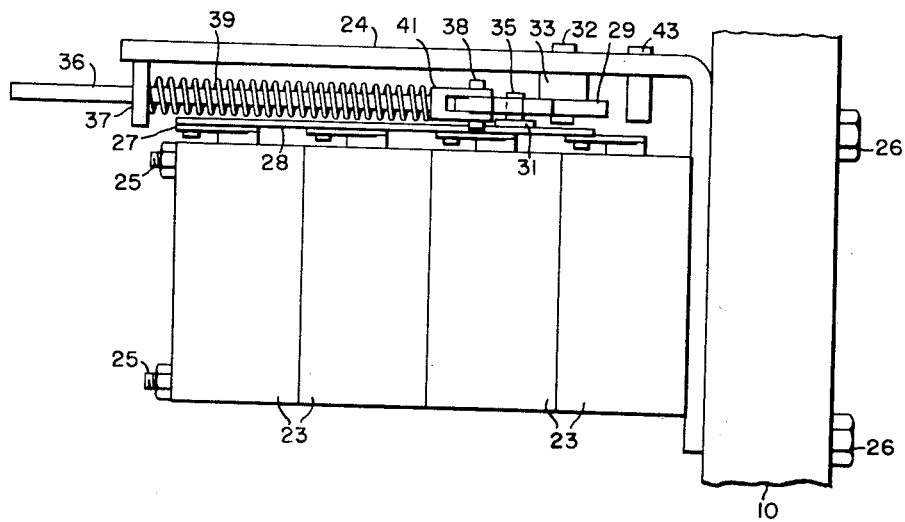
Fig. 3 is an enlarged view, in side elevation, of the mechanism and switches shown in Fig. 2.

In accordance with this invention, the relay connections are changed for lower voltage testing and this is preferably done automatically when the protector unit is moved from the operating position to the test position. To do this we have provided for operating a group of auxiliary switches 23 by movement of the protector unit between the operating and the test positions. As shown most clearly in Fig. 3, the auxiliary switches 23 are attached to a bracket 24 by means of stud bolts 25 and the bracket 24 is attached to the panel 10 by stud bolts 26. As shown in Figs. 2 and 3, each switch 23 has an operating arm 27 connected to a link 28 which, in turn, is connected to an operating lever 29 through a link 31. The operating lever 29 is attached to the bracket 24 by means of a pin 32. A spacing sleeve 33 is disposed between the lever 29 and the bracket 24. The link 28 is connected to the link 31 by means of a pin 34 and the link 31 is connected to the operating lever 29 by means of a pin 35. A rod 36 which is slidably mounted in a guide 37 on the bracket 24 is connected to the operating lever 29 by means of a pin 38. A spring 39 is disposed on the rod 36 between the guide 37 and a yoke 41 on the end of the rod 36 which is connected to the operating lever 29.

As shown in Fig. 2, the operating lever 29 is engaged by the end of a bracket 42 when the protector unit is in the operating position. The bracket 42 is attached to the supporting structure 22. Thus, the operating lever 29 is moved to the position shown in Fig. 2, and all of the switches 23 are actuated to one position, when the protector unit is in the operating position in the supporting structure. When the protector unit is rolled out to the test position the operating lever 29 is disengaged from the bracket 42 and the spring 39 moves the operating lever 29 to a position in which it engages a stop pin 43 which is attached to the bracket 24. Thus, the switches 23 are all actuated to another position by movement of the protector unit between the operating and test positions.

Figure 4:
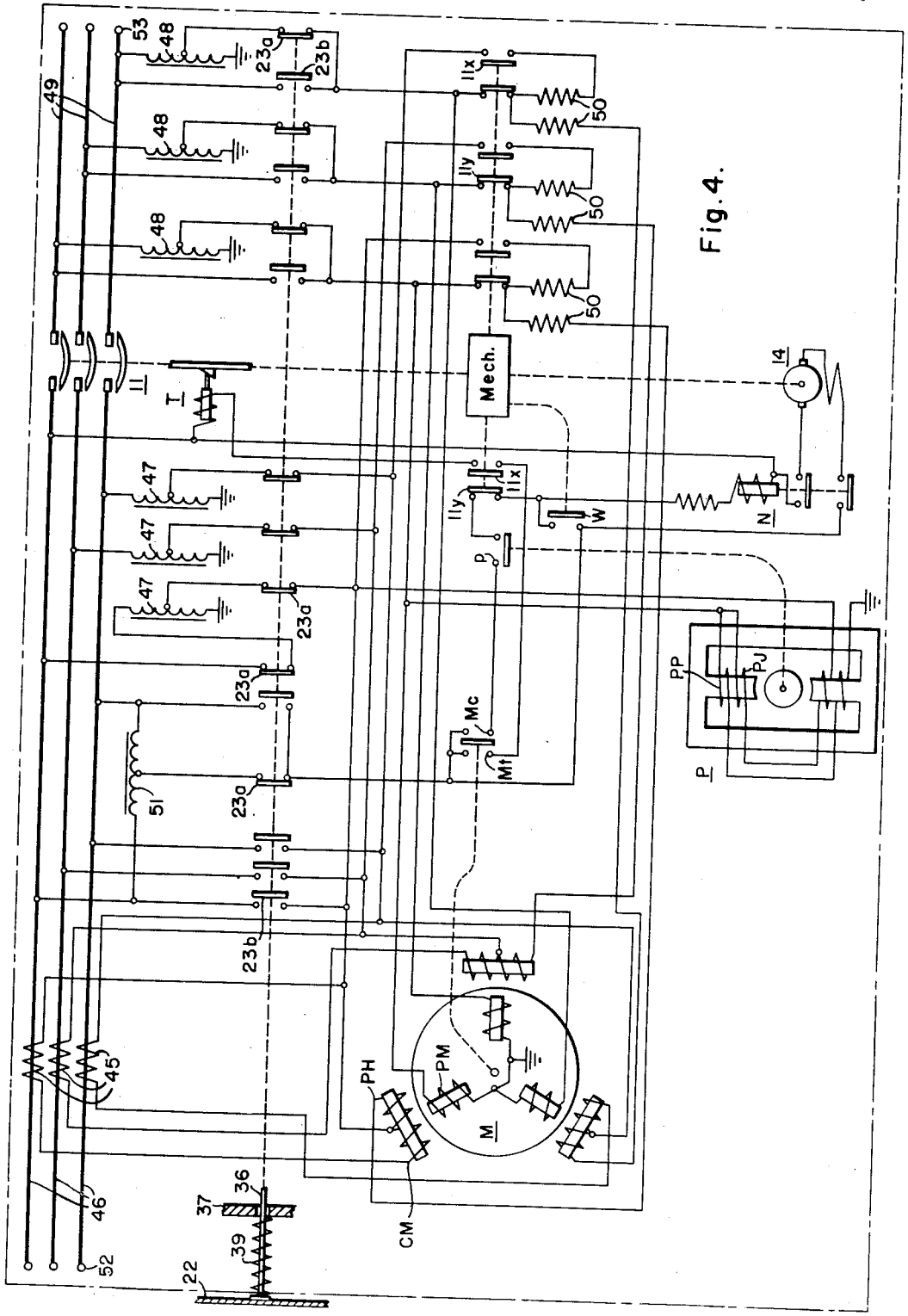
Fig. 4 is a diagrammatic view of circuit connections for the network protector.

In the diagram shown in Fig. 4, the protector unit is shown in the operating position in the supporting structure and the contact members of the auxiliary switches which are closed when the protector unit is in the operating position are designated by the reference character 23a. The contact members of the auxiliary switches which are closed when the protector unit is in the test position are designated by the reference character 23b.

In addition to the auxiliary switches 23, auxiliary switches which are actuated by the operating mechanism for the interrupter unit 11 in the usual manner are provided. The contact members of these switches which are closed when the interrupter unit is closed are designated by the reference character 11x. The contact members which are closed when the interrupter unit is open are designated by the reference character 11y. An additional auxiliary switch W is also actuated by the operating mechanism.

The master relay M has contact members Mc which are closed to close the interrupter unit and contact members Mt which are closed to open the interrupter unit. The phasing relay P has contact members p which must be closed in order to close the interrupter unit. A control relay N is provided for controlling the energization of the motor 14 which drives the operating mechanism to close the interrupter unit. The operation of the relay N is controlled by the master relay M and the phasing relay P in the manner described in the aforesaid Patent 2,264,982. A tripping mechanism T is provided for opening the interrupter unit 11. The energization of the tripping mechanism is controlled by the contact members Mt of the master relay M.

Current transformers 45 which are energized by the incoming power conductors 46 are provided for energizing current coil windings CM of the master relay M. Autotransformers 47 which are energized by the incoming power conductors 46 are connected to potential coil windings PM of the master relay M through one group of contact members 23a. One set of potential coil windings PP for the phasing relay P is also connected to one of the autotransformers 47.

Additional autotransformers 48 which are energized by the outgoing power conductors 49 are connected to phasing coil windings PH of the master relay M through another group of contact members 23a. The phasing coil windings PJ on the relay P are also connected to one of the autotransformers 48.

The value of phasing resistors 50, used in the phasing circuit of relay M, is controlled by switches 11x and 11y and depends on whether the interrupter unit is in the open or closed position. A control power autotransformer 51 which is connected across one phase of the incoming power conductors 46 is connected to the contact members of the control relay N through contact members 23a to supply power for operating the motor 14. Thus, the control relays and the operating motor 14 are supplied with a reduced voltage when the protector unit is in the operating position and the incoming power conductors 46 are energized with a higher distribution voltage.

When the protector unit is rolled out to the test position the contact members 23a are opened and the contact members 23b closed in the manner previously described. When the contact members 23a are opened and the contact members 23b closed the potential coils of the relays M and P and the control relay N are connected directly to the power conductors 46 and 49 through the contact members 23b of the auxiliary switches 23. Thus, a lower test voltage may be applied to the power conductors 46 and 49 which are disconnected from the power distribution system when terminals 52 and 53 of the protector unit are disconnected prior to the moving of the unit from the operating to the test position. One of the auxiliary switch contacts 23a is utilized to disconnect one of the autotransformers 47 from one of the power conductors 46 completely when the protector unit is in the test position to assure that stray voltage effects are not introduced into the phasing circuit of the phasing relay which is connected to phase 1 of the system.

Accordingly, the relays and the control apparatus of the protector unit may be tested in the manner described in the aforesaid Patent 2,376,775 with the same test equipment which is utilized for testing protectors normally operating at the lower voltage. Therefore, it is not necessary for the operating companies to provide two sets of testing equipment and to train their personnel to test network protectors at two different voltages.

When the protector unit is moved to its operating position in the supporting structure the auxiliary switches 23 are automatically actuated to the position for operating at the higher voltage. The relays and control equipment are energized through the auto transformers when the terminals 52 and 53 are connected to the in-coming and out-going power conductors, thereby applying a reduced voltage to this apparatus.

From the foregoing description it is apparent that we have provided for automatically changing the connections for a network protector from operating connections suitable for operating at a relatively high voltage to test connections for testing the equipment at a relatively low voltage. The change-over is made by movement of the protector unit from the operating to the test position by mechanical means which are positive in their operation. Therefore, there is no possibility of a partial change-over or no change-over which could happen if the change-over were dependent upon manual operation. In this manner, no reliance is made on any manual functions other than rolling the protector unit between the operating and the test positions.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In protective apparatus, in combination, a supporting structure, a protective device unit mounted in the structure and movable relative to the structure, relay means on the unit for controlling the operation of the protective device, transformer means on the unit for energizing the relay means with a predetermined voltage, and lever-operated switching means actuated by movement of the unit for connecting the relay means to the transformer means.

2. In protective apparatus, in combination, a supporting structure, a protective device unit mounted in the structure and movable relative to the structure, circuit interrupting means carried by the unit, relay means on the unit for controlling the opening and the closing of said interrupting means, transformer means on the unit for energizing the relay means with a predetermined voltage during operation of the device, and spring-biased switching means released by movement of the unit for disconnecting the relay means from the transformer means during testing of the device.

3. In protective apparatus, in combination, a supporting structure, a protective device unit mounted in the structure and movable between operating and test positions, circuit interrupting means carried by the unit, relay means on the unit for controlling the opening and the closing of the interrrupting means, transformer means on the unit for energizing the relay means with a predetermined voltage during operation of the device, and lever-operated switching means actuated by movement of the unit between operating and test positions for changing circuit connections for said relay means.

4. In protective apparatus, in combination, a supporting structure, a protective device unit mounted in the structure and movable between operating and test positions, terminal means for connecting the unit to external power conductors when the unit is in the operating position, circuit interrupting means carried by the unit, relay means on the unit for controlling the opening and the closing of the interrupting means, transformer means on the unit for energizing the relay means with a predetermined voltage during operation of the device, and switching means actuated by movement of the unit for transferring connections for the relay means from the transformer means to the terminal means when the unit is moved from the operating position to the test position.

5. In protective apparatus, in combination, a supporting structure, a protective device unit mounted in the structure and movable between operating and test positions, terminal means for connecting the unit to external power conductors when the unit is in the operating position, circuit interrupting means carried by the unit, relay means on the unit for controlling the opening and the closing of the interrupting means, transformer means on the unit for energizing the relay means with a predetermined voltage during operation of the device, switching means for connecting the relay means to the transformer means when the unit is in the operating position, additional switching means for connecting the relay means to the terminal means when the unit is in the test position, actuating means for operating said switching means, and means on the supporting structure engaging said actuating means to operate the switching means.

6. In protective apparatus, in combination, a supporting structure, a protective device unit mounted in the structure and movable between operating and test positions, terminal means for connecting the unit to external power conductors when the unit is in the operating position, circuit interrupting means carried by the unit, relay means on the unit for controlling the opening and the closing of the interrupting means, transformer means on the unit for energizing the relay means with a predetermined voltage during operation of the device, switching means for connecting the relay means to the transformer means when the unit is in the operating position, additional switching means for connecting the relay means to the terminal means when the unit is in the test position, actuating means for operating said switching means, and means on the supporting structure cooperating with said actuating means to operate the switching means when the unit is moved between the test and the operating positions.

7. In protective apparatus, in combination, a supporting structure, a protective device unit mounted in the structure and movable between operating and test positions, terminal means for connecting the unit to external power conductors when the unit is in the operating position, circuit interrupting means carried by the unit, relay means on the unit for controlling the opening and the closing of the interrupting means, transformer means on the unit for energizing the relay means with a predetermined voltage during operation of the device, switching means for connecting the relay means to the transformer means when the unit is in the operating position, additional switching means for connecting the relay means to the terminal means when the unit is in the test position, actuating means for operating said switching means, means on the supporting structure engaging said actuating means to operate the switching means when the unit is moved from the test to the operating position, and spring means for operating the switching means when the unit is moved from the operating to the test position.

8. In protective apparatus, in combination, a supporting structure, a protective device unit mounted in the structure and movable between operating and test positions, circuit interrupting means carried by the unit, power conductors on the unit connected to the circuit interrupting means, relay means on the unit for controlling the opening and the closing of the interrupting means, transformer means on the unit for energizing the relay means with a predetermined voltage during operation of the device, switching means carried by the unit and operable to one position to connect the relay means to the transformer means when the unit is in the operating position, and said switching means being operable to another position to connect the relay means to the power conductors when the unit is in the test position.

9. In protective apparatus, in combination, a supporting structure, a protective device unit mounted in the structure and movable between operating and test positions, circuit interrupting means carried by the unit, power conductors on the unit connected to the circuit interrupting means, relay means on the unit for controlling the opening and the closing of the interrupting means, transformer means on the unit for energizing the relay means with a predetermined voltage during operation of the device, switching means carried by the unit, said switching means being operable to one position to connect the relay means to the transformer means only when the unit is in the operating position, and said switching means being operable to another position to connect the relay means to the power conductors only when the unit is in the test position.

References Cited in the file of this patent

UNITED STATES PATENTS

| | | |
|---|---|---|
| 2,346,460 | Sillers | Apr. 11, 1944 |
| 2,376,775 | Johnson | May 22, 1945 |
| 2,600,304 | Krida | June 10, 1952 |
| 2,735,042 | Hayford et al. | Feb. 14, 1956 |